United States Patent [19]

Miyagaki et al.

[11] Patent Number: 5,268,835
[45] Date of Patent: Dec. 7, 1993

[54] PROCESS CONTROLLER FOR CONTROLLING A PROCESS TO A TARGET STATE

[75] Inventors: Hisanori Miyagaki, Hitachiota; Akira Sugano, Katsuta; Atsushi Takita, Mito; Eiji Toyama, Ibaraki; Katsuhito Shimizu; Haruya Tobita, both of Hitachi; Hiroshi Matsumoto, Ibaraki; Masahide Nomura; Tooru Kimura, both of Hitachi, all of Japan

[73] Assignee: Hitachi, Ltd., Tokyo, Japan

[21] Appl. No.: 762,332

[22] Filed: Sep. 19, 1991

[30] Foreign Application Priority Data

Sep. 19, 1990 [JP] Japan .................................. 2-246977

[51] Int. Cl.[5] .................. G06F 15/46; G05B 13/04
[52] U.S. Cl. .................................. 364/151; 364/164; 364/157; 395/61; 395/900; 395/904
[58] Field of Search .................. 354/148, 149-151, 354/164, 165, 176, 177, 152-159, 160-163; 318/561, 632; 395/3, 21, 61, 900, 904, 906

[56] References Cited

U.S. PATENT DOCUMENTS

| | | | |
|---|---|---|---|
| 3,758,762 | 9/1973 | Littman et al. | 364/165 |
| 4,213,175 | 7/1980 | Kurihara | 364/151 X |
| 4,577,270 | 3/1986 | Sugano et al. | 364/151 |
| 4,791,548 | 12/1988 | Yoshikawa et al. | 364/151 X |
| 4,868,754 | 9/1989 | Matsumoto | 364/150 X |
| 5,166,873 | 11/1992 | Takatsu et al. | 364/151 |

OTHER PUBLICATIONS

Trans. IEEE of Japan, "Proportional–Plus–Integral Prediction Control Method"; vol. 105-C, No. 6, Jun. 1985; pp. 9-16.
"Steam Temperature Prediction Control for Boiler Using the Kalman Filter", Instrumentation, an Extra Number; 1983; pp. 113-115.
Sato et al., "Steam Temperature Prediction Control for Thermal Power Plant", IEEE Trans. on Power Apparatus and System, vol. PAS-103, Sep. 1984, pp. 2382-2387.
Endo et al., "Improvements in Operation of Machine 2 of Niigata Port Thermal Power Station", Thermal and Nuclear Power Generation; vol. 41, No. 1, Jan. 1990; pp. 26-36.
Hitachi Technical Review "Autotuning System For PID Controller to which Fuzzy Inerence is Applied", vol. 71, No. 8, Aug. 1989, pp. 115-122.

Primary Examiner—Joseph Ruggiero
Attorney, Agent, or Firm—Antonelli, Terry, Stout & Kraus

[57] ABSTRACT

A process controller having a setting section for giving a target value for a fixed period of time, a control section including a predicting section for predicting a process response for the fixed time period in accordance with a current value of a process control amount and a virtual value of an operation amount; a quantitating section for quantitating a difference between the target value and the result by the predicting section; a calculating section for calculating a basic signal of the operation amount in accordance with the quantitated result, and an optimizing section including a predicting section for predicting a process response for the fixed time period with a control amount and an initial operation amount of the process; another quantitating section for quantitating a difference between the prediction and the target value, a calculating section for calculating the operation amount in accordance with the second quantitated result; and a section for performing control in such a way that the quantitating result and a predetermined evaluation criterion are compared with each other to perform an evaluation. The calculated result of the operation amount is repeatedly applied to the predicting section until the evaluation criterion is satisfied, a correcting signal used for optimizing the operation amount is obtained from a value of the operation amount when the quantitated result satisfies the criterion, and the correcting signal is added to a basic signal of the control section, and the adding result is output to the process.

13 Claims, 12 Drawing Sheets

INPUT SIGNAL

LS : VERY SMALL
MS : MEDIUM SMALL
LS : LITTLE SMALL
ME : MEDIUM
LB : LITTLE BIG
MB : MEDIUM BIG
VB : VERY BIG

PROCESS CONTROLLER FOR CONTROLLING A PROCESS TO A TARGET STATE

BACKGROUND OF THE INVENTION

1. Field of the Invention

The present invention relates to a process controller and more particularly to a process controller which is suitable for control of a plant, such as a thermal power plant, in which a response gain of the process, a time constant, a dead time and the like vary in a non-linear manner in accordance with a load level, and in which the time constant and the dead time are large.

2. Description of the Related Art

With respect to prediction control there is known that described in an article "Proportional-Plus-Integral Prediction Control Method", Trans. IEEE of Japan, Vol. 105-C, No. 6, June, 1985, in which a control amount after n minutes is predicted and an operation amount is calculated on the basis of a deviation between that actual control amount and the desired amount after n minutes by the proportional-plus-integral prediction control.

As for the control which is considered impossible since a time constant and a dead time are large and the characteristics thereof change considerable and in a non-linear manner in accordance with a load, steam temperature control of a boiler of a thermal power plant is conventionally known.

For example, with respect to such control in which the main steam temperature of a boiler after n minutes is predicted using the Kalman filter and an operation amount is calculated by the proportional-plus-integral control on the basis of a deviation between that main steam temperature and the target value after n minutes, disclosure has been made in an article "Steam Temperature Prediction Control for Boiler Using the Kalman Filter", instrumentation, an extra number, 1983, pp. 113-115 and in an article "Steam Temperature Prediction Control for thermal Power Plant", IEEE Transaction on Power Apparatus and System, Vol. PAS-103, No. 9, September, 1984.

Further, as for such control in which the technology disclosed in the above article entitled "Steam Temperature Prediction Control for Boiler Using the kalman Filter" is applied, there is known an article "Improvements in Operation of Machine 2 of Niigata Port Thermal Power Station", Thermal and Nuclear Power Generation, Vol. 41, No. 1, Jan. 1990.

As for a method in which a model of a thermal power generation plant is used for correcting parameters of a control system, particularly in which a dynamic characteristic model of a thermal power generation plant is obtained by the autoregression method, using the resultant model, optimal values of PID control parameters are obtained by conventional technique. such as the critical sensitivity method, and the results are printed to be displayed, as described in JP-A-61-3202.

In addition thereto, with respect to a method in which the neuro-fuzzy is applied to a plant control, the following control methods are known:

As for the method in which the fuzzy inference is applied to a proportional-plus-integer 1 control system to realize an autotuning system, there is known an article "Autotuning System for PID Controller to which the Fuzzy Inference is Applied", Hitachi Technical Review, Vol. 71, No. 8, August, 1989.

As for the method in which when the standard starting schedule is corrected with respect to a starting equipment of a power generation plant, the simulation by the dynamic characteristic model of the plant is performed by means of the fuzzy inference, JP-A-63-945005, JP-A-63-94007, JP-A-6394008, and the U.S. Pat. No. 4,868,754 are known.

As for the method in which an identification neural network is made to learn the characteristics of the process, and by using a resultant model, the parameters of the neural network model for the optimization solution are determined thereby to determine the optimal operation amount, JP-A-2-161501 is known.

Hitherto, as the control method of the steam temperature of the boiler of the thermal power generation plant, the following methods are taken.

(1) As described in JP-B-64-10721 for the purpose of reducing an overshoot or an undershoot from a target value which is caused by the manipulation delay due to a large time constant and dead time of the process, an operation amount is maintained at the same value as in the current state, a control amount after one control period is predicted using an equation of state of the process with the current value of the control amount being treated as an initial value, the equation of state is repeatedly used with the predicted value being treated as an initial value, to thereby predict a deviation between a steam temperature of the future and a target value thereof, a proportional-plus-integral calculation result based on the deviation is added to a fuel operation command signal in the form of a correction signal, and the composite signal is treated as an operation amount signal to control the process.

(2) As described in JP-A-58-40612, a method is employed such that a control system is made to include therein the total system model of the process, and by using the control system, an optimal value of an operation amount is searched on the basis of the mathematical programming. In other words, the non-linearity is modeled in the form of table information, or is expressed in the form of a physical formula, to thereby obtain an optimal value of the operation amount using the non-linear planning which is typified by the complex method.

In the above-mentioned prior art, there arise the following problems

PRIOR ART METHOD I (1) Since essentially the object of the non-linear operation is modeled in a linear manner and the modeled result is repeatedly used, there is the possibility that a model error due to the linearization is accumulated in the prediction error of the control amount.

(2) The deviation between the predicted value of the control amount and the target value thereof is directly applied to an input of a linear integrator to directly perform the calculation, and the calculated result is used as the operation amount signal. Therefore, there is the possibility that the prediction error due to the model and set values of the control parameters of the linear integrator directly influence upon a final control element, and the unnecessary disturbance may be applied to the plant.

PRIOR ART METHOD II

The non-linear planning or the like, such as the complex method, is employed to search of the optimal value of an operation amount so that the determination of the operation amount requires too much time. Therefore, there are some problems in the application of this method to the real-time control.

SUMMARY OF THE INVENTION

It is therefore an object of the present invention to provide a process controller in which a response gain of the process, a time constant, a dead time and the like vary in a non-linear manner in accordance with a load. It is a further object that unnecessary disturbance due to the control model error and the nonconformance of set values of control parameters of a linear integrator do not influence the process having a large time constant and dead time, and that the controlled variable of the process is controlled stably and favorably to the target value.

In order to attain the above objects, the present invention comprises:

a target value setting, section for giving a control target value beginning with the current time:

a control section including therein a process response predicting section for predicting a process response in the future in accordance with a current value of a process control amount and a virtual value of an operation amount, a prediction response quantitating section for quantitating a difference between the target value and the result by the predicting section, and an operation amount calculating section for calculating a basic signal of the operation amount in accordance with the quantitating result; and an operation amount optimizing section including therein a process response predicting section for predicting a process response in the future with a control amount and an operation amount of the process being treated as initial values, a prediction response quantitating section for quantitating a difference between the predicting result and the target value, an operation amount calculating section for calculating the operation amount in accordance with the quantitating result, and a section for performing control in such a way that the quantitating result and a predetermined evaluation criterion are compared with each other to perform the evaluation, the calculating result of the operation amount is repeatedly applied as an input to the process response predicting section until the evaluation criterion is satisfied, an operation amount correcting signal used for optimizing the operation amount is obtained from a value of the operation amount when the quantitating result satisfies the criterion, the correcting signal is added to an operation amount basic signal of the control section, and the adding result is output to the process.

Then, in the control section, the response of the process up to the fixed period of time from the current time can be predicted, the result of quantitating the difference between the predicted value and the target value given by the target setting section can be learned in advance, and the basic signal of the operation amount used for decreasing the difference between the target value and the predicted value after the fixed period of time can be obtained using the quantitating result.

In the operation amount optimizing section, the response of the process up to the fixed period of time from the current time in the case where the basic signal of the operation amount is outputted to the process is predicted, the difference between the target value given by the target setting section and the predicted value is quantitated, and it is determined whether or not the result of the quantitation (e.g., the control deviation after the fixed period of time) satisfies the evaluation criterion. Wherein the evaluation criterion is not satisfied, the subsequent operation amount is newly calculated using the subsequent quantitating result, the calculating result is applied as an input of the process response predicting section, and the above procedure is repeated until the criterion is satisfied, whereby an optimal operation amount can be obtained. The optimal operation amount signal is used as the correction signal for the basic signal of the operation amount in the control section, and the difference between the optimal signal and the basic signal is input to the control section. The operation amount signal from the control section is output as an addition signal which is obtained by adding the basic signal to the correcting signal. As a result, the operation signal corresponding to the correcting signal is as a preceeding signal, added in advance to the process. Therefore, it is possible to perform optimal control without any influence from the unnecessary disturbance.

The value of the optimal operation amount is certified in the case where the prediction accuracy of the process response in the control section satisfies the criterion and the control parameters of the calculating section of the operation amount is suitably set. However, there is the possibility that the control characteristics of the process are largely changed by the change or the like of the load, the difference between the response predicting result of the process and the actual response of the process increases so as to exceed the reference value, or the nonconformance occurs in the control parameters of the operation amount calculating section. As a result, there arises the possibility that the optimization of the operation amount signal may not be certified.

In a parameter tuning section, the characteristic parameters of the prediction model of the process response predicting section in each of the control section and the operation amount optimizing section are corrected in such a way as to decrease the deviation between the actual response signal of the process with respect to the operation amount signal output from the control section and the signal output from the real-time plant response simulator, whereby the calculating result of the process response predicting section is made to correspond to the response of the actual process. On the other hand, the control parameters of the operation amount calculating section in each of the control section and the operation amount optimizing section are corrected in such a way that with respect to the actual response of the process, the response characteristics thereof are evaluated in the form of evaluation indexes such as the ratio of the settling time to the target time, the damping ratio and the overshoot quantity, thus satisfying the predetermined evaluation criterion.

The correcting operation of the above parameter tuning section allows the characteristic parameters of the prediction model in each of the control section and the operation amount optimizing section to be corrected to the value in conformity with the characteristics of the process. As a result, it is possible to ensure the optimization of the operation amount output from the control section.

DESCRIPTION OF THE PREFERRED EMBODIMENTS

Embodiments of the present invention will hereinafter be described in detail with reference to the accompanying drawings.

Figure 1:
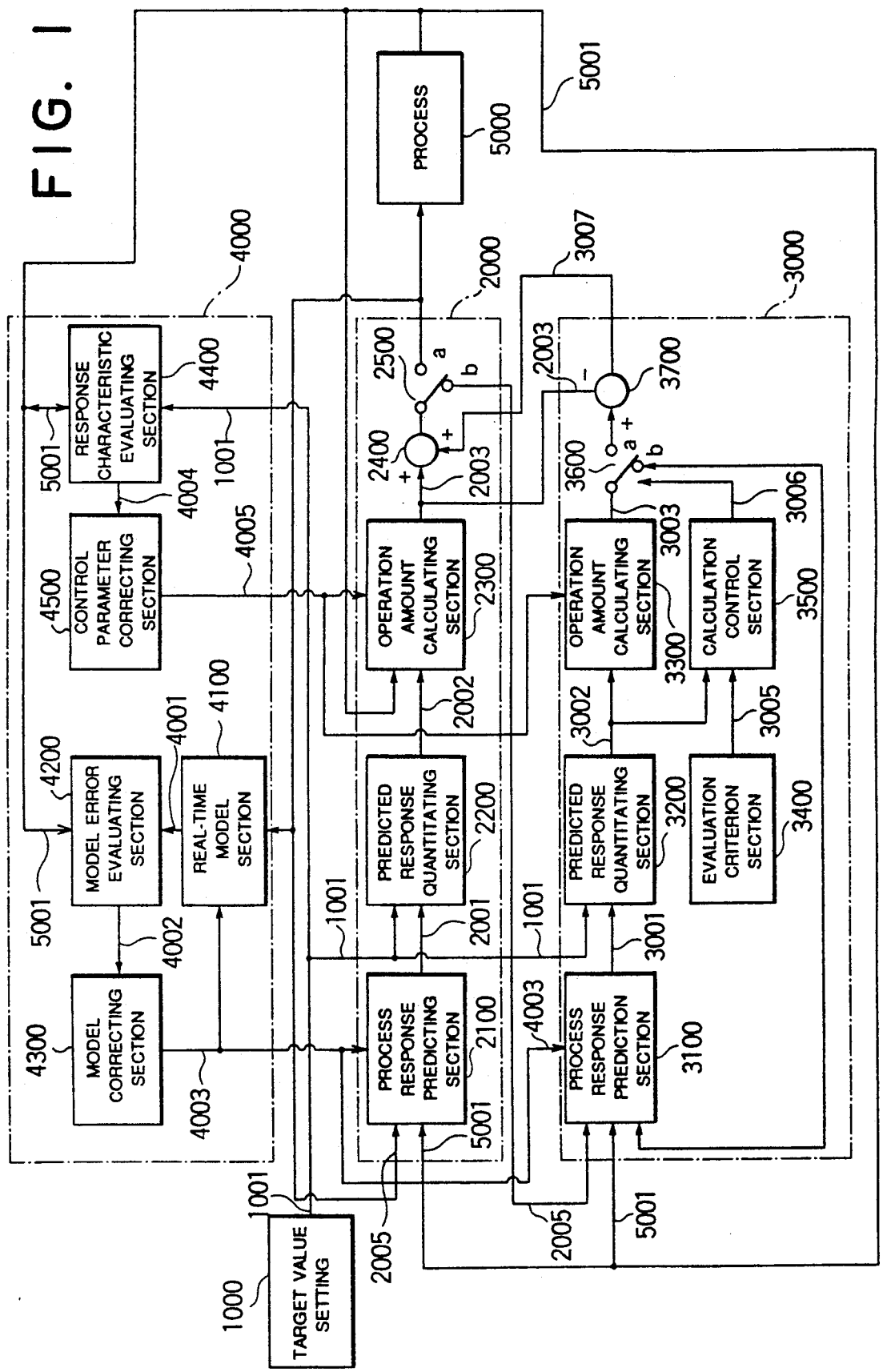
FIG. 1 is a block diagram showing one embodiment of a process control system of the present invention.

FIG. 1 is a block diagram showing an embodiment of a process control system to which the present invention is applied. The present system includes a target value setting section 1000, a control section 2000, an operation amount optimizing section 3000, a parameter tuning section 4000, and a process 5000 which is to be an object of the control The setting section 1000 produces a control target value 1001 for the process control up to the fixed period of time after the current time in the future.

In the control section 2000, a process response predicting section 2100 predicts a response value 2001 for the process control up to the fixed period of time after the current time. A predicted response quantitating section 2200 quantitates the predicted value 2001 in accordance with the predicted value 2001 and the control target value 1001. An operation amount calculating section 2300 outputs a basic signal 2003 of an operation amount in accordance with the quantitated result 2002 of the predicted value. An adding section 2400 adds the basic signal 2003 and an operation amount optimizing signal 3007 to each other to output a total operation amount signal 2005. A switching circuit 2500 switches over the signal 2005 to either the side (a) of the process 5000 or the side (b) of the optimizing section 3000.

In the optimizing section 3000, a process response predicting section 3100 receives the current total operation amount signal 2005 and a process control amount signal 5001 to predict a response value 3001 by the process control up to the fixed period of time. A predicted response quantitating section 3200 outputs a quantitated result 3002 of the predicted response value in accordance with the predicted value 3001 and the control target value 1001. An operation amount calculating section 3300 outputs a virtual value 3003 of an operation amount in accordance with the quantitated result 3002 of the above predicted response. An evaluation criterion section 3400 outputs an evaluation criterion 3005 used for evaluating the quantitated result 3002. A calculation control section 3500 outputs an output switching signal 3006 obtained from a result of comparing the quantitated result 3002 with the evaluation criterion 3005. A switching circuit 3600 switches over the virtual value 3003 to either the side (a) of the control section 2000 or the side (b) of the predicting section 3100.

An adder 3700 subtracts a value of the basic signal 2003 from the virtual value 3003 to output a resultant difference 3007, as an optimization signal, to the adder 2400 of the control section 2000.

In the section 4000, a real-time model section 4100 infers the response of the process to the total operation amount signal 2005 in a real-time manner to output an inference signal 4001. A model error evaluating section 4200 quantitatively evaluates a difference between the inference signal 4001 and a process control amount signal 5001 to output an inferring model error 4002. A model correcting section 4300 calculates corrected amount of characteristic parameters of a process response predicting model in the predicting section 2100 of the control section 2000 and the predicting section 3100 of the optimizing section 3000 in accordance with the inferring model error 4002 to correct each of the predicting sections 2100 and predicting section 3100 using a correcting signal 4003. A response characteristic evaluating section 4400 quantitatively evaluates real response characteristics (the overshoot, the settling time and the like) of the control amount signal 5001 to the control target value 1001 to output the evaluated result 4004. A control parameter correcting section 4500 corrects control parameters of the calculating section 2300 of the control section 2000 and the calculating section 3300 of the optimizing section 3000.

The description will subsequently be given with respect to the operation of the present embodiment.

In the control calculation of the section 2000, the switching circuit 2500 is first switched over to the side (b), the process response up to the fixed period of time after the current time is predicted by the predicting section 2100, taking the current control amount signal 5001 and the operation amount signal 2005 as initial values, and a deviation 3002 between the predicted process response and the control target value 1001 is calculated by the quantitating section 2200. The calculating section 2300 calculates the operation amount basic signal 2003 in accordance with the deviation signal 2002.

On the other hand, the optimizing section 3000 switches over the switch of the switching circuit 3600 to the side (b), the predicting section 3100 predicts the process response up to the fixed period of time, taking the current control amount of the signal 5001 and the operation amount of the signal 2005 as initial values, and the quantitating section 3200 calculates the deviation 3002 between a value of the predicted process response 3001 and the control target value 1001. The calculating section 3300 outputs the virtual value 3003 in accordance with the deviation signal 3002. On the other hand, the calculation control section 3500 determines whether the deviation 3002 is smaller than the evaluation criterion 3005, i.e., whether the evaluation criterion 3005 is satisfied. When the evaluation criterion is satisfied, the switching circuit 3600 is switched over to the side (a) in accordance with the switching signal 3006, so that the operation amount of signal 3007 obtained by subtracting the operation amount of the basic signal 2003 from the virtual value 3003 in a subtracter 3700 is output. The optimized operation amount of the signal 3007 is added to the operation amount of the basic signal 2003 by the adder 2400 of the control section 2000 so that the total operation amount 2005 is obtained. The switching circuit 2500 is switched over to the side (a) to output the total operation amount 2005 to the process 5000 as an optimal operation amount. On the other hand, when the deviation 3002 does not satisfy the evaluation criterion, the switching circuit 3600 remains switched over to the side (b), the virtual value 3003 is changed into the operation amount to the predicting section 3100, and the above procedure is repeated until the evaluation criterion is satisfied.

The tuning section 4000, first, corrects the characteristic parameters of the predicting model and the real-time model to the predicting sections 2100 and 3100 with the correcting signal 4003, in accordance with the difference between the inference signal 4001 of the process response obtained from the real-time model section 4100 and the actual response signal 5001, using the evaluating section 4200 and the correcting section 4300. Thus, the prediction accuracy of the process response and the real-time prediction accuracy are improved.

On the other hand, the predicting section 4400 evaluates the response characteristics of the process in accordance with the relation between the actual response signal 5001 of the process and a signal of the target value 1001, and tunes the control parameters of the calculating sections 2300 and 3300 to optimal values in accordance with the correcting signal 4505 output from the correcting section 4500, in such a way that the response characteristics are not deviated from a predetermined reference value as the characteristic change of the process.

Figure 2:
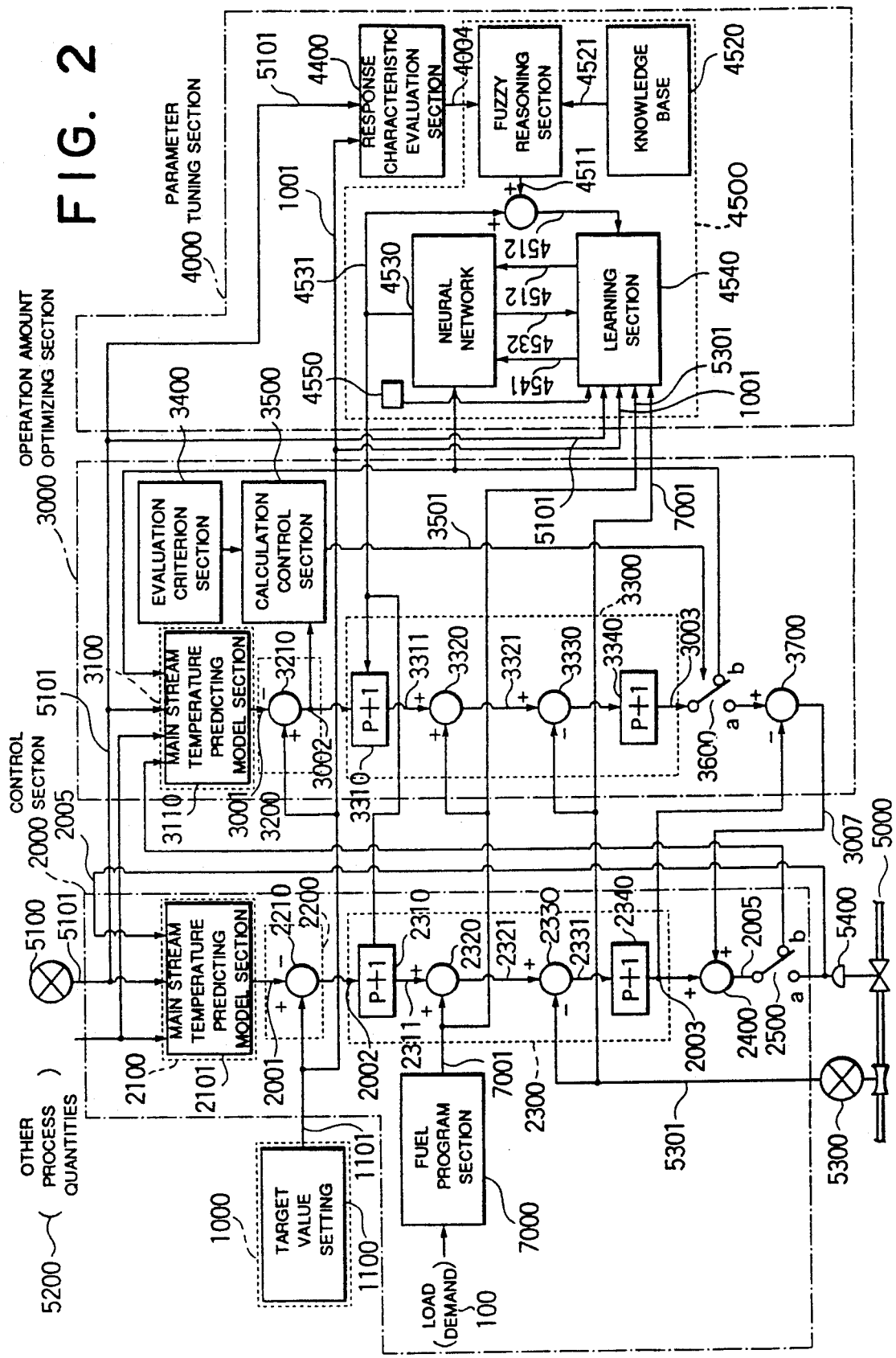
FIG. 2 is a block diagram showing an example in which the present invention is applied to main steam temperature control of a thermal power generation plant.

FIG. 2 is a block diagram showing a configuration of an embodiment in which the present invention is applied to a main steam temperature control of a thermal power generation plant. In the present embodiment, fuzzy inference and a neural network are applied to a control parameter correcting section 4500. The description will hereinbelow be given with respect to the arrangement and operation of the present embodiment.

A control section 2000 includes a main steam temperature predicting model section 2100 which receives a main steam temperature 5101 from a main steam temperature transmitter 5100, and a fuel operation amount 2005, as well as a process amount 5200 necessary for prediction of main steam temperature to predict a main steam temperature 2001 after the fixed period of time, a subtracter 2210 which calculates a deviation 2002 between a target value 1001 of the main steam temperature obtained from a section 1100 for setting the main steam temperature target value and the predicted value 2001 of the main steam temperature, a linear integrator 2310 which receives a deviation 2002 to perform a proportional-plus-integral calculation, a fuel program section 7000 which converts a load demand 100 into a fuel command 7001, an adder 2310 which adds the fuel command 7001 and an output from an integrator 2310 to each other, a subtracter 2330 which subtracts a fuel flow amount signal 5301 from a transmitter 5300 of a fuel flow amount from an output 2321 of the adder 2320, a linear integrator 2340 which receives an output 2331 from the subtracter 2330 to perform a proportional-plus-integral calculation, an adder 2400 which adds an output 2003 from the linear integrator 2340 and an optimization signal 3007 of an operation amount to each other, and a switching circuit 2500 which switches over a total operation amount signal 2005 as an output from the adder 2400 to either the side (a) of a fuel control valve 5400 or the side (b) of an operation amount optimizing section 3000.

The optimizing section 3000 includes a section 3110 of a model predicting the main steam temperature which receives the main steam temperature 5101 and the fuel operation amount 2005 as well as a process amount 5200 necessary for prediction of the main steam temperature to predict a main steam temperature 3001 after the fixed period of time, and a subtracter 3210, a linear integrator 3310, an adder 3320, a subtracter 3330 and a linear integrator 3340 which have the same functions of those of the subtracter 2210 the linear integrator 2310, the adder 2320, the subtracter 2330 and the linear integrator 2340 in the control section 2000, respectively. The optimizing section 3000 further includes a calculation control section 3500 which compares an output signal 3002 from the adder 3210 and a signal of an evaluation criterion value 3401 output from an evaluation criterion section 3400 with each other to output an output switching signal 3501, a switching circuit 3600 which is controlled by the signal 3501 to switch over an output signal 3003 from the linear integrator 3340 to either the side (a) of the control section 2000 or the side (b) of the predicting model section 3110, and an adder 3700 which calculates a difference between the output signal 3003 and the output signal 2003 from the linear integrator 2340 to add a resultant signal 3007 to the adder 2400.

A parameter tuning section 4000 includes a neural network 4530 which receives the target value 1001, a fuel command 7001, a main steam temperature 1501, and a value 4550 of a predictive time (the value after n minutes from the current time) to output a signal used for setting a proportional gain and an integration time constant of the linear integrators 2310 and 3310, a section 4400 for evaluating response characteristics which receives the main steam temperature 5101 and a setting value 1001 of the main steam temperature to quantitatively evaluate the response characteristics of the main steam temperature, a fuzzy reasoning section 4510 which outputs a correction amount 4511 of the control parameters by the fuzzy reasoning in accordance with a quantitative evaluation result 4004 and a knowledge 4521 from a knowledge base 4520, and a learning section 4540 which receives the target value 1001, the fuel command 7001, the main steam temperature 5101 and the predictive time 4550 as learning signals and the value of the control parameters 4512 after the correction as a teacher signal to make the neural network 4530 learn optimal control parameters 4512. Incidentally, the reference numeral 4541 designates a learning input of the neural network 4530, the reference numeral 4512 the teacher signal, and the reference numeral 4532 a reading signal of internal information from the neural network.

The control operation of the present embodiment will hereinbelow be described.

The linear integrator 2310 determines the correcting signal used for making the main steam temperature follow the setting value in accordance with the deviation between the predicted value 2001 of the main steam temperature predicted by the predicting model section 2110 and the setting value 1001 of the main steam temperature. The linear integrator 2340 determines the control basic signal 2003 for the fuel adjusting valve 5400 in accordance with the signal 2331 of the deviation between the fuel amount signal 5301 and the total fuel command 2321, which is obtained by correcting the fuel command 7001 in accordance with the correcting signal 2311.

On the other hand, in the optimizing section 3000 as well, the virtual value 3003 of the operation amount for the fuel amount is calculated by the same procedure. However, in the case where a value of the signal 3002 of the deviation between the predicted value 3001 and the setting value 1001 of the main steam temperature exceeds the evaluation criterion value 3401, the virtual value 3003 is input as the operation amount signal of the fuel amount from the predicting model 3110 (the switching circuit 3600 is switched over to the side (b)), and thereafter, the iterative calculation is carried out. In the case where a value of the deviation signal 3002 is smaller than the evaluation criterion value 3401, the switching circuit 3600 is switched over to the side (a), so that the optimizing signal 3007 is output. This signal is added to the control basic signal 2003 by the adder 2400 to generate the total operation amount signal 2005. After the switching circuit 3600 is switched over to the side (a), the switching circuit 2500 is switched over to the side (a), so that the total operation amount signal 2005 is output as the control signal for the fuel control value 5400.

The description will subsequently be given with respect to the operation of the parameter tuning.

The control parameters of the linear integrators 2310 and 3310 are set in accordance with the target value 1001 of the main steam temperature, the fuel command 7001, the predictive time 4550, and the main steam temperature 5101, in response to the setting value 4531 of the control parameter, on the basis of the contents which ar learned in advance by the neural network 4530.

The change of the learning contents of the neural network 4530 is performed in the following manner. First, in the response characteristic evaluating section 4400, the response characteristics of the main temperature 5101 to the setting value 1001 are quantitated and evaluated in accordance with the evaluation indexes such as the overshoot quantity, the damping ratio and the setting time ratio. On the basis of the classification of the evaluated result by the membership functions, and the correcting rules stored in the knowledge base 4520, the correcting signal 4511 for the control parameters is determined by the fuzzy reasoning section 4510. Then, a subsequent control parameter setting signal 4512 is newly produced by adding the correcting signal 4511 to a control parameter setting signal 4531 before the correction. Input to the learning section 4540 are the main steam temperature 5101, the fuel flow amount 5301, the setting value 1001, the fuel command 7001, the prediction time 4550 and the evaluation indexes of the above response characteristic, and is given the above signal 4512 as the teacher signal. Thus, a new network is formed by the learning. As a result, when the same input conditions as in the above case after the subsequent time, the same value as that of the teacher signal will be output from the neural network.

Thus, with the process 5000, the operational characteristics will be improved in a self-growth manner as the results are accumulated one after another (the present embodiment is improved in that the main steam temperature follows the target value).

Figure 3:
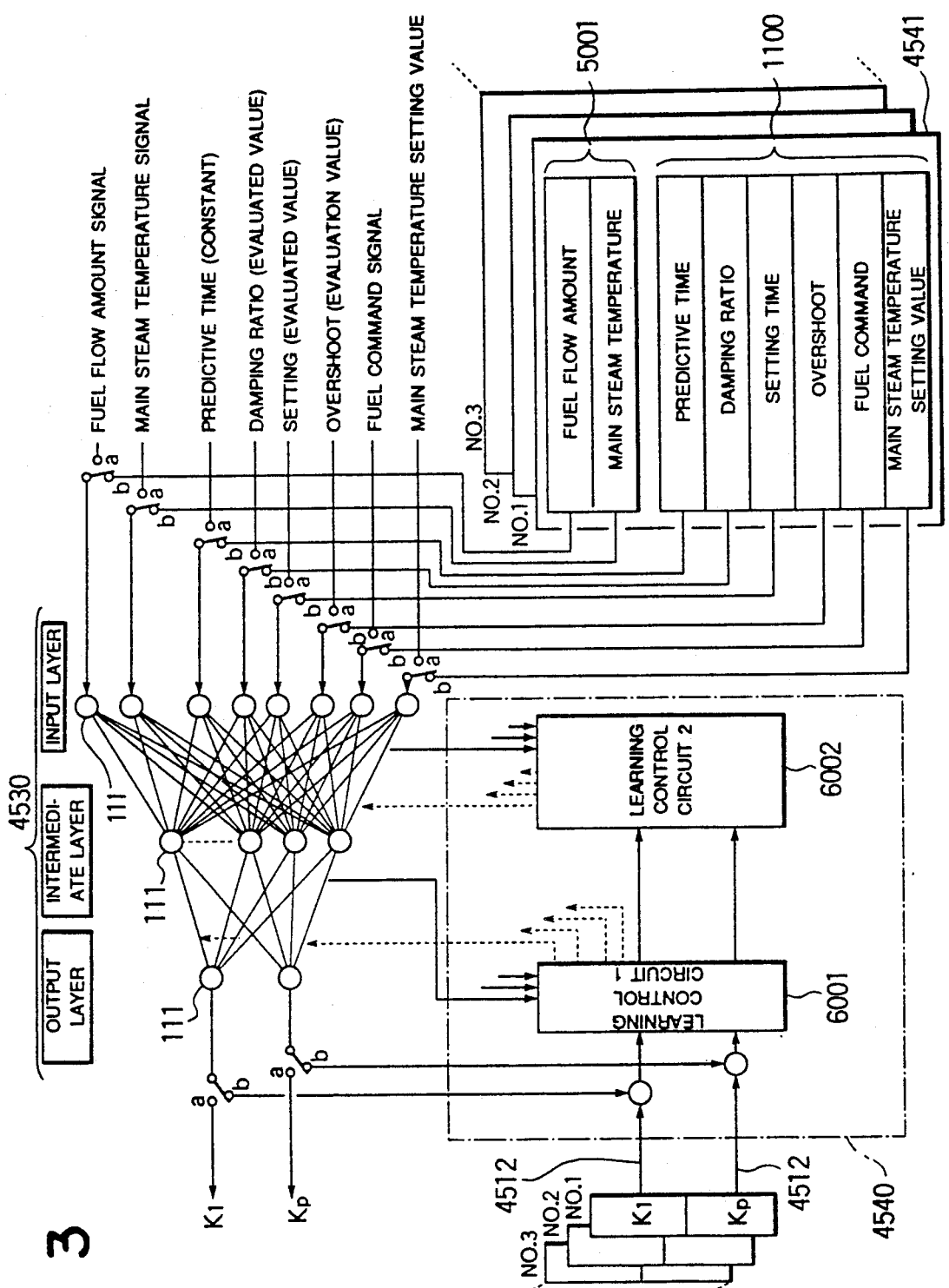
FIG. 3 is a block diagram showing an example in which a neural network and a learning method are applied to the main steam temperature control of the thermal power generation plant.

FIG. 3 is a view showing a neural network 4530 and the relationship between a learning input signal 4541 of the network and a learning control parameter (in the present embodiment, the learning control parameters include a proportional gain setting Kp and an integration gain setting $K_I$) setting signal 4512. The learning input signal 4541 is made up of a target setting value 1100 and a control amount 5001 of the process. Then, by the setting value 1100 it means the setting value of the main steam temperature, the fuel command, the overshoot quantity, the settling time ratio, the damping ratio, the prediction time and the like. Moreover, by the control amount 5001 of the process, it means the main steam temperature, the fuel flow amount and the like. That is, the number of units of an input layer is, as described above, eight, and the number of units of an output layer is two. Moreover, the number of units of an intermediate layer does not need to be exactly determined and therefore it may be arbitrary.

Figure 4:
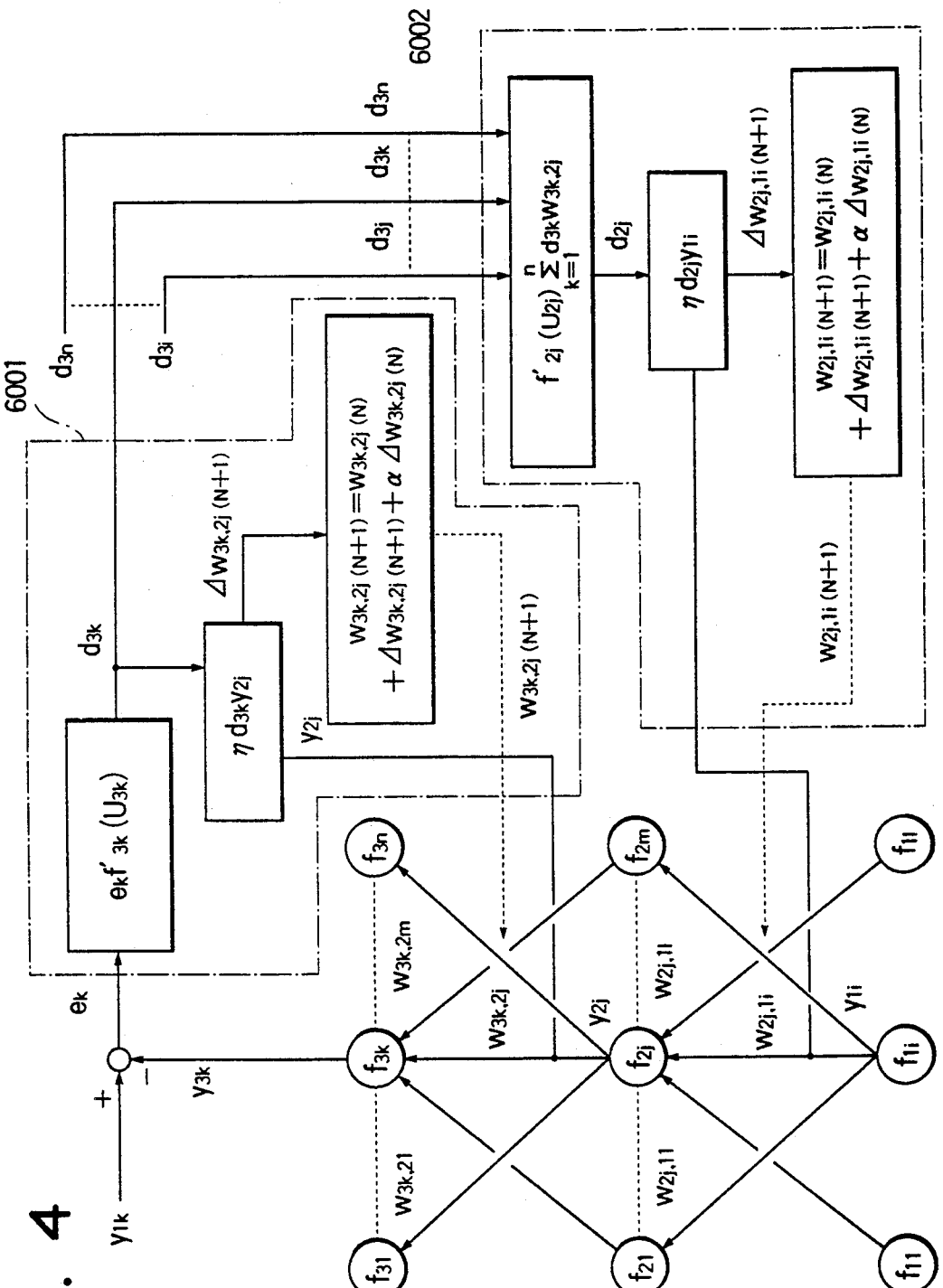
FIG. 4 is a diagram for explaining a learning algorithm of the neural network.

The reference numeral 4540 designates a learning section which includes a first learning control circuit 6001 which receives outputs of the intermediate layer to correct the weights of inputs of the output layer and a second learning control circuit 6002 which receives outputs of the input layer to correct the weights of inputs of the intermediate layer. The concrete arrangements of the circuits 6001 and 6002 are shown in FIG. 4.

A new learning input signal 4541 and a new learning control parameter correcting signal 4512 are respectively supplied to the input layer and the output layer of the neural network 4530, one after another, as the plant accumulates the operational results. Thus, the synapse weight of the neural network will be improved by the learning section 4540 and the operational performance of the process will be improved in a self-growth manner.

Figure 5:
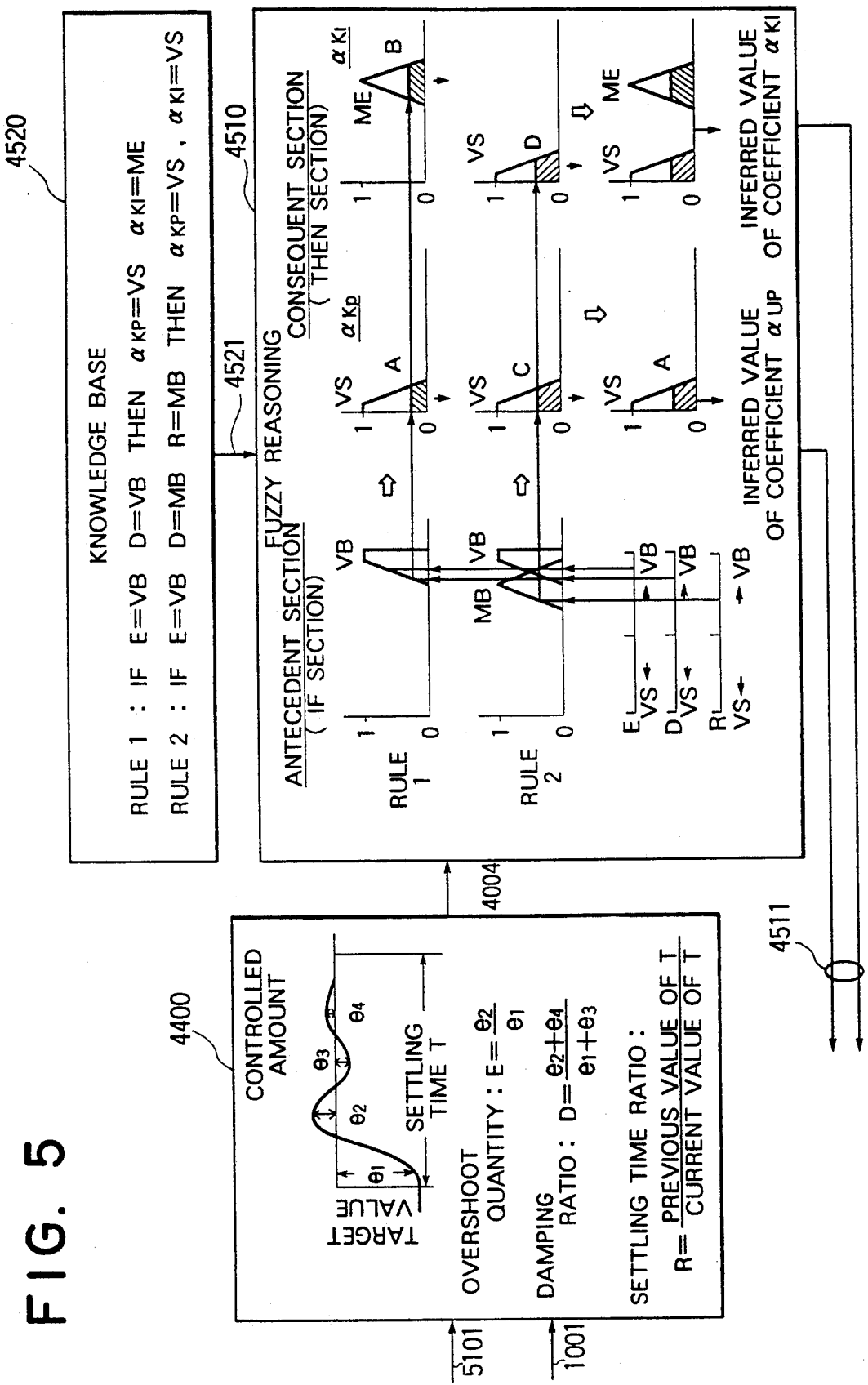
FIG. 5 is a diagram showing an example in which a teacher signal of the neural network of FIG. 3 is produced by the fuzzy inference.
Figure 6:
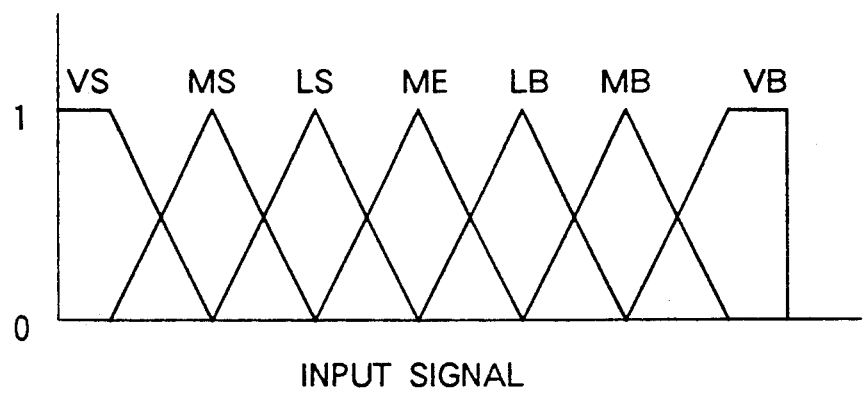
FIG. 6 is a graphical representation showing membership functions of the fuzzy inference of FIG. 5.

FIG. 5 is a view showing a concrete example of a method of determining the correction signal 4511 for the control parameters by the fuzzy reasoning in FIG. 2. In the evaluating section 4400, the response characteristics of the main steam temperature 5101 are first evaluated with respect to three indexes including the overshoot quantity E, the damping ratio D and the settling time ratio R in the relationship to the target value 1001 of the main steam temperature. The fuzzy reasoning section 4510 applies the evaluated values in accordance with the evaluation indexes to the membership functions shown in FIG. 6 and determines which classes the evaluated values belong to.

Subsequently, the rule of interest is selected from the correcting rules of the control parameters stored in the knowledge base 4520, the results obtained using the above membership functions are applied to condition section (IF section), and the conclusion is introduced in a conclusion section (THEN section) by the fuzzy logic calculation. That is, in the present example, the values of E and D are first applied to the condition section of the rule 1 (then, put as $x_E$ and $x_D$), and the adaptation $\omega_1$ is obtained from the following equation (1).

$$\omega_1 = \min(VB(x_e), VB(x_D)) \tag{1}$$

In the present example, the relationship of $\omega_1 = VB(x_D)$ is established. As a result, a correction coefficient $a^1_{KP}$ of the proportional gain and a correction coefficient $\alpha^1_{KI}$ of the integration gain by the rule 1 are obtained in the form of values on the x-coordinate of the gravities of slanting line portions A and B in the section 4510 of FIG. 5, respectively. Subsequently, with respect to the rule 2 as well, the same inference calculation is performed. If a value of R is put as $x_R$, the adaptation $\omega_2$ is given by $$\omega_2 = \min(VB(x_e), VB(x_D), MB(x_R)) \quad (2)$$

In the present example, the relationship of $\omega_2 = MB(x_R)$ is established. As a result, a correction coefficient $\alpha^2_{KP}$ of the proportional gain and a correction coefficient $\alpha^2_{KI}$ of the integration gain are obtained in the form of values of the x-coordinate of the gravities of slanting line portions C and D in the section 4510 of FIG. 5, respectively.

In the present example, it is assumed that only the rules 1 and 2 are applied thereto. Thus, if, as the result of combining the calculation results by both the rules, composite correction coefficients are represented by $\alpha_{kP}$ and $\alpha_{kI}$, respectively, $\alpha_{kP}$ is obtained in the form of a value of the x-coordinate of the result of combining the gravities of the slanting line portions A and C in the section 4510 of FIG. 5, while $\alpha_{kI}$ is obtained in the form of a value of the x-coordinate of the result of combining the gravities of the slanting portions B and D in the section 4510 of FIG. 5.

Figure 7:
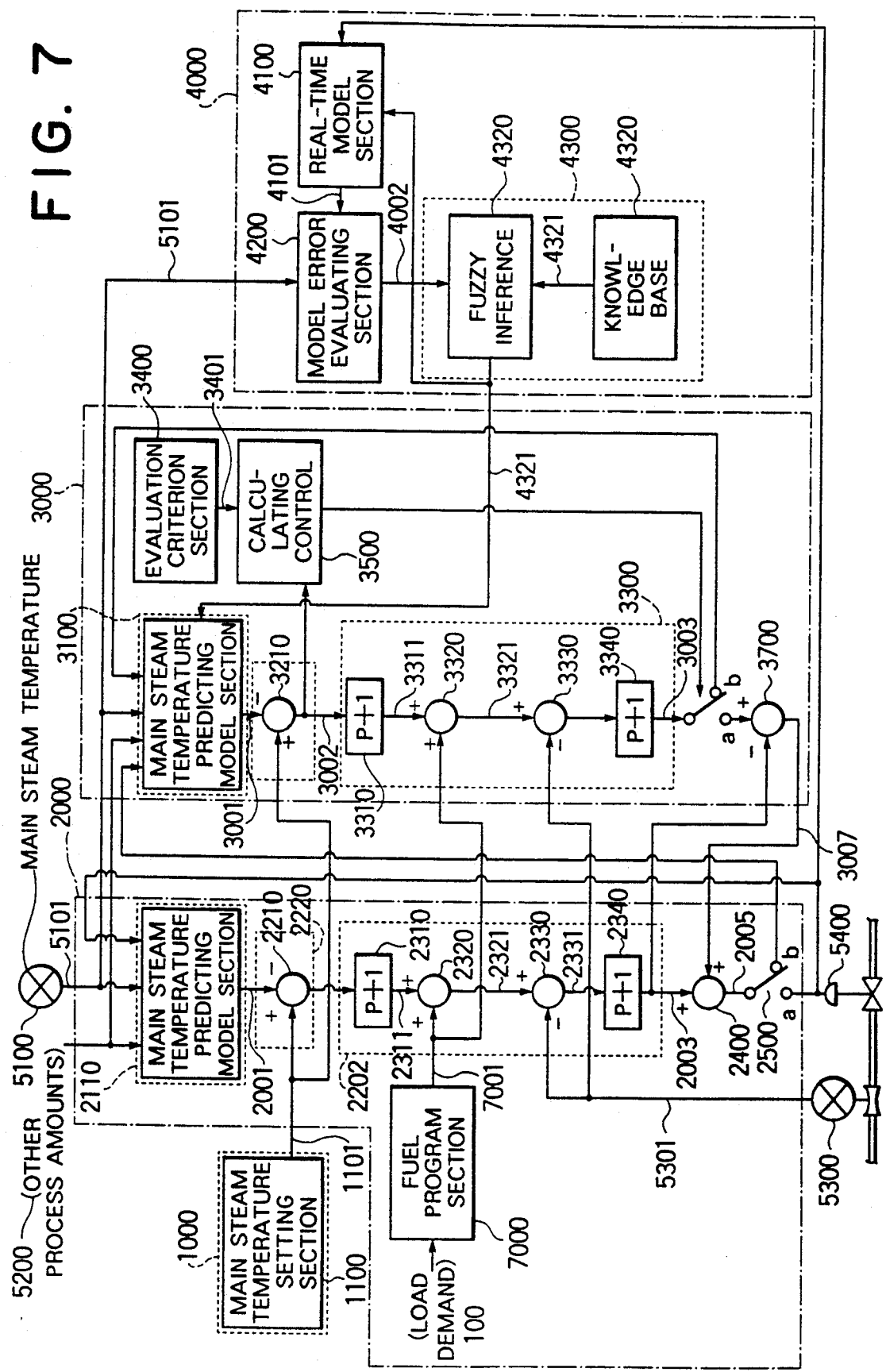
FIG. 7 is a block diagram showing an example in which the fuzzy inference is applied to model correction.

FIG. 7 is a block diagram showing the arrangement in which a system by the fuzzy reasoning is applied as the predicting model correcting section 4300 of FIG. 1, by taking the main steam temperature of the thermal power generation plant shown in FIG. 2 as an example. The present embodiment will hereinbelow be described. First, embodiments of predicting models 2110 and 3110, and a real-time model 4100 will be described.

The predicting models 2110 and 3110, and the real-time model 4100 are different in method of application and object of application from each other, as already described with reference to FIG. 1 and FIG. 2. However, the arrangement of the model is essentially the same. Thus, in the present embodiment, for brevity, there is shown an example of a secondary heater model which will hereinbelow be described.

The thermal transfer model of the secondary heater can be expressed with the following equations, by applying the law of conservation of energy thereto.

$$T_s \cdot \frac{d\theta_{so}}{dt} = -\theta_{so} + \left(\frac{C_{po}}{C_{pi}}\right) \cdot \theta_{si} + k_s \cdot (\theta_m - \theta_s) \quad (3)$$

$$T_g \cdot \frac{d\theta_m}{dt} = -\theta_m + K_s \cdot \theta_g + K_f \cdot \theta_g \quad (4)$$

$$\theta_g = g(F_f, F_a, F_{grf}, F_{gBf}) \quad (5)$$

where $$T_s = \frac{V_s \cdot \gamma_s}{F_s} \quad (6)$$

$$T_s = \frac{C_m \cdot M_m}{A(\alpha_{gm} + \alpha_{ms})} \quad (7)$$

$$K_s = \frac{A \cdot \alpha_{ms} \cdot C_{po}}{F_s} \quad (8)$$

$$K_g = \frac{\alpha_{gm}}{\alpha_{gm} + \alpha_{ms}} \quad (9)$$

$$K_{gf} = \frac{\alpha_{ms}}{\alpha_{gm} + \alpha_{ms}} \quad (10)$$

and $V_s$: a capacity of a pipe flow path
$\gamma_r$: a specific weight of an internal fluid
$F_s$: a flow rate of an internal fluid
$C_{po}$: a specific heat at constant pressure of steam in an outlet of a secondary heater
$C_{pi}$: a specific heat at constant pressure of steam in an inlet of a secondary heater
A: a thermal transfer area of a secondary heater
$\alpha_{ms}$: a coefficient of thermal conductivity from a pipe to steam
$\theta_{so}$: a steam temperature of an outlet of a secondary heater
$\theta_{si}$: a steam temperature of an inlet of a secondary heater
$\theta_m$: a pipe temperature
$\theta_s$: an internal fluid temperature
$C_m$: a pipe specific heat
$M_m$: a pipe weight
$\alpha_{gm}$: a coefficient of thermal conductivity from gas to a pipe
$F_f$: a flow rate of fuel
$F_a$: a flow rate of air
$F_{grf}$: a flow rate of recycled gas
$F_{gBf}$: a flow rate of gas of a boiler The description will subsequently be given with respect to the operation of the correcting section 4300 in which the above model is an object, with reference to FIG. 7.

A model error evaluation section 4200 compares a main steam temperature 5101 and a prediction result 4101 by the real-time model 4100 with each other to evaluate them. As a result, in a fuzzy reasoning section 4310, the correction quantities for the characteristic parameters of Ts, Tg, Ks, Kg, Kf and the like which are shown in the equations (2) through (5) of the above predicting models 2110 and 3110, and the real-time model 4110 are calculated using a signal 4002 and a characteristic parameter correcting rule 4321 stored in a knowledge base 4320 by the fuzzy logic. By the resultant signals, the characteristic parameters are corrected. Thus, it is possible to correct the prediction errors of the process response due to the predicting models 2110 and 3110

Figure 8:
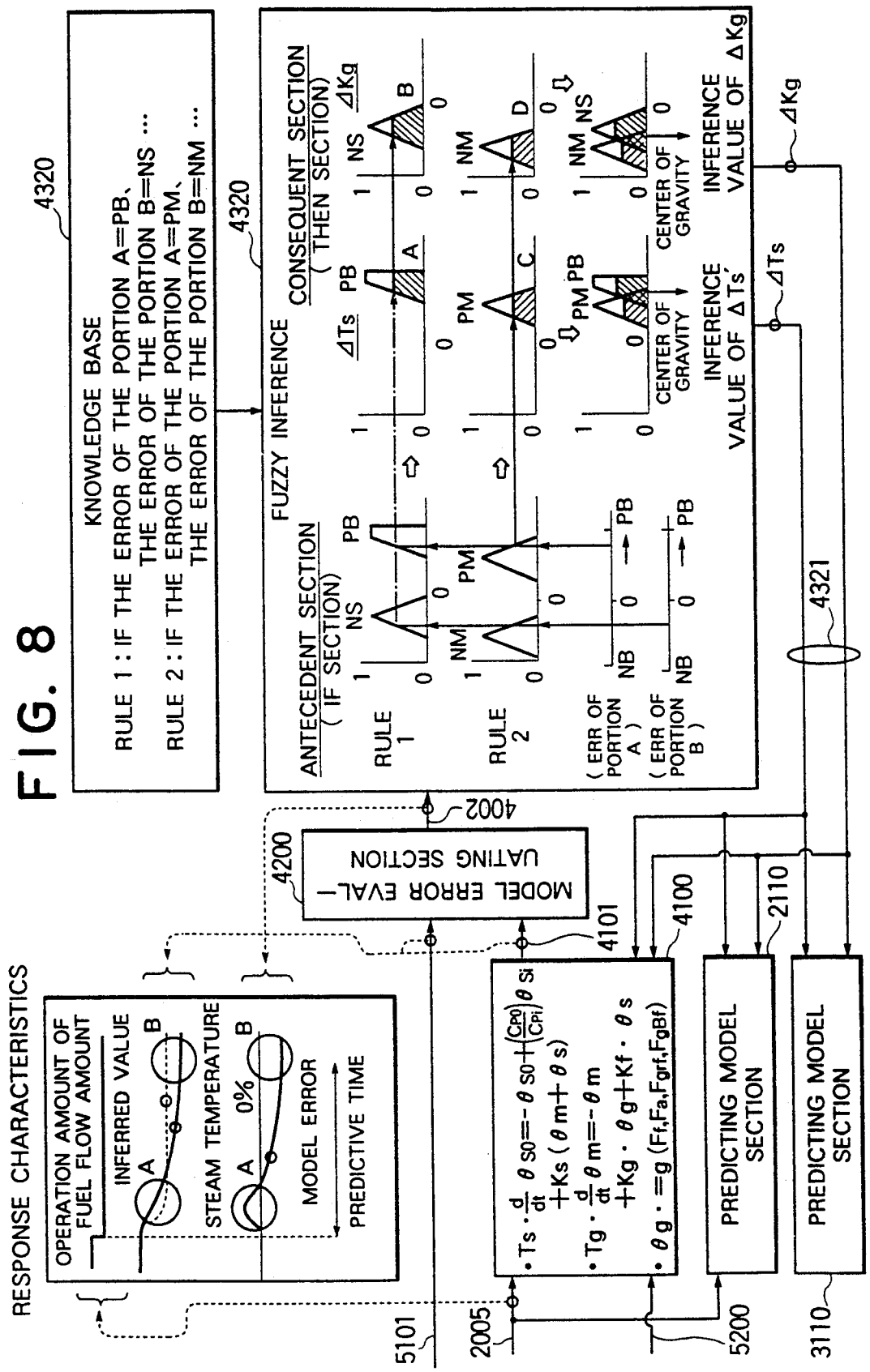
FIG. 8 is a diagram showing an embodiment of the fuzzy inference of FIG. 7.

FIG. 8 is a diagram showing a concrete example of the fuzzy reasoning method of the embodiment shown in FIG. 7.

In the present embodiment, a deviation between a predicted value 4101 by the real-time model 4100 of a secondary heater outlet temperature to an operation amount 2005 of a fuel flow amount, and an actual value 5101 is evaluated with an error of the response characteristics, i.e., portions A and B in FIG. 8 in the model error evaluating section 4200. On the basis of those values, a correction amount $\Delta Ts$ of the characteristic parameter Ts and a correction quantity $\Delta Kg$ of the characteristic parameter Kg are calculated. That is, the fuzzy reasoning section 4320 applies the error of the portion A and the error signal 4002 of the portion B by the evaluating section 4200 to the membership functions shown in FIG. 8 and determines which classes the errors belong to.

Subsequently, the rule of interest is selected from the characteristic parameter correcting rules of the characteristic parameters stored in the knowledge base 4320, the results obtained using the above membership functions are applied to a condition section (IF section), and the conclusion is introduced in a conclusion section (THEN section) by the fuzzy logic calculation. That is, in the present embodiment, the error $\epsilon_A$ of the portion A and the error $\epsilon_B$ of the portion B are first applied to the condition section of the rule 1, and the adaptation $\omega_1$ is obtained from the following equation (11).

$$\omega_1 = \min(PB(\epsilon_A), NS(\epsilon_B)) \quad (11)$$

In the present embodiment, since $NS(\epsilon_s) < PB(\epsilon_A)$ is true, the relationship of $\omega_1 = NS(\omega_B)$ is established. As a result, correction amounts for the time constant Ts and the gain Kg by the rule 1 are obtained in the form of values on the x-coordinate of the gravities of slanting line portions A and B in the section 4320 of FIG. 8, respectively. With respect to the rule 2 as well, similarly, the adaptation $\omega_2$ is given by:

$$\omega_2 = \min(PM(\epsilon_A), NM(\epsilon_B)) \quad (12)$$

In the present embodiment, since $PM(\epsilon_A) < NM(\epsilon_B)$ is true, the relationship of $\omega_2 = PM(\epsilon_A)$ is established. As a result, correction amounts for the time constant Ts and the gain Kg by the rule 2 are obtained in the form of values on the x-coordinate of the gravities of slanting line portions C and D in the section 4320 of FIG. 8, respectively.

In the present embodiment, it is assumed that only the rules 1 and 2 are applied thereto. Thus, if, as the result of combining the calculated results by both the rules, composite correction amounts for the time constant Ts and the gain Kg are represented by $\Delta$Ts and $\Delta$Kg, respectively, $\Delta$Ts is obtained in the form of value of the x-coordinate of the result of combining the gravities of the slanting line portions A and C, while $\Delta$Kg is obtained in the form of value of the x-coordinate of the result of combining the gravities of the slanting line portions B and D.

Incidentally, in the embodiments shown in FIG. 1 and FIG. 2, process response predicting sections 2100 and 3100, prediction response quantitating sections 2200 and 3200, and operation amount calculating sections 2300 and 3300 which are provided in the control section and an operation amount optimizing section, respectively, are individually provided. However, the control section and the process response predicting section are different in object of application from each other, but are essentially the same with processing. Thus, in carrying out the present invention, even if the controller is arranged in such a way that the individual processing sections are unified, and the unified section is shared between the control section and the process response prediction section, this arrangement does not depart from the object of the present invention.

Figure 9:
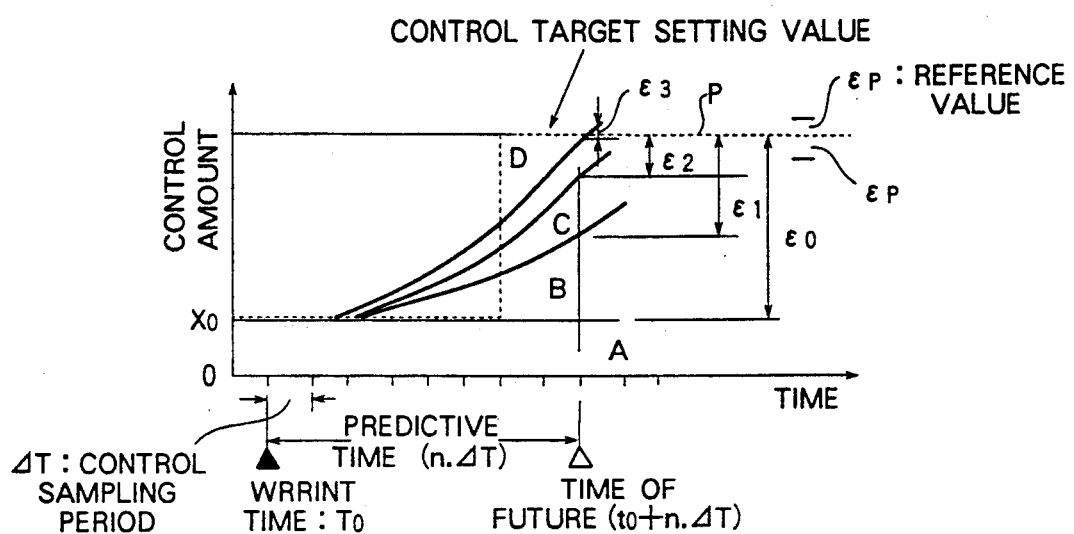
FIGS. 9A to 9C are graphical representations showing an embodiment of a method of determining an optimal operation amount.
Figure 9:
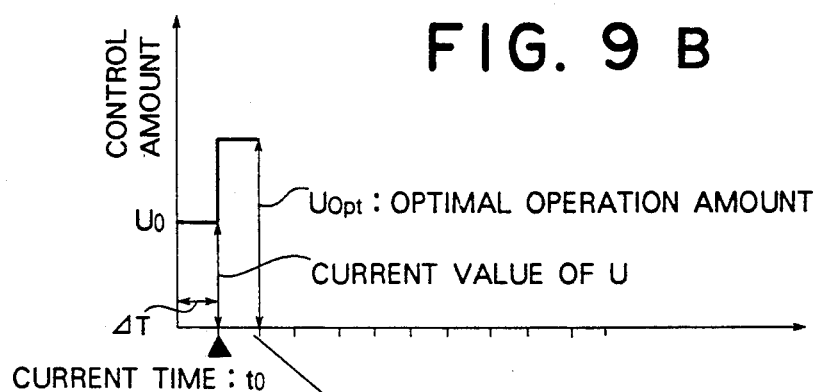
Figure 9:
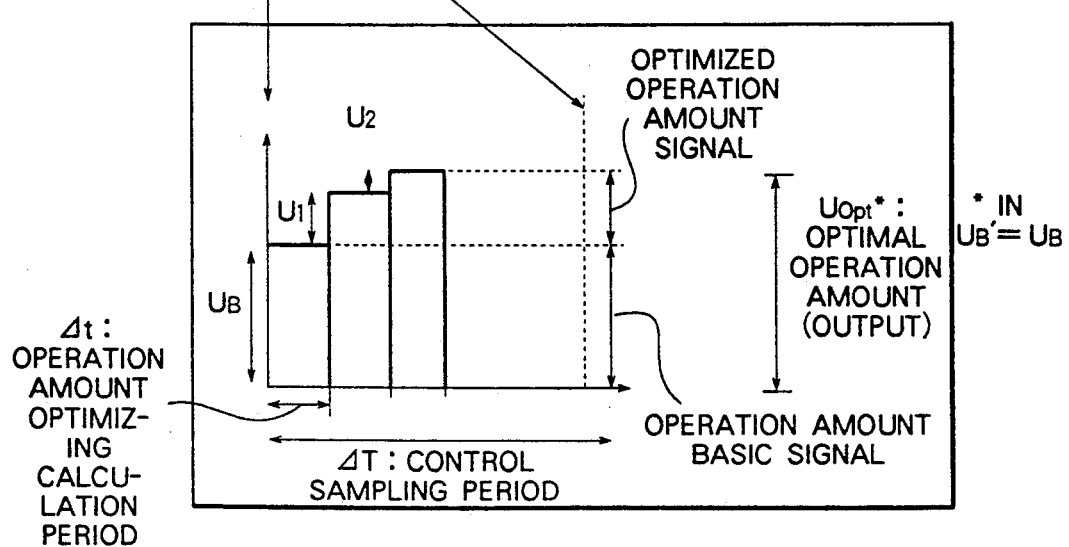

FIG. 9 is a graphical representation showing an embodiment of a method of determining an optimal operation amount $u_{opt}$ when the control target setting value at the time u of the future is given by P. The operation thereof will hereinbelow be described on referring to the embodiment of FIG. 2.

First, in FIG. 9A, the control target 1001 is given in the form of curve P. In the case where the control amount 2005 in FIG. 9B is not changed from the current value $u_o$ if the response of the control amount up to the time $(t_o + n \cdot \Delta t)$ of the future is given by A, the control deviation 2002 at the time of the future will be $\epsilon_o$. In the control section 2000, hereinafter, an operation amount basic signal $u_B$ is calculated in accordance with the deviation $\epsilon_o$. In an optimizing section 3000, the evaluation criterion $\epsilon_p$ and the deviation $\epsilon_o$ are compared with each other. Then, if the relationship of $|\epsilon_o| > \epsilon_p$ is established, the response of the control amount up to the time of the future is obtained in the form of curve B with the signal $u_B$ and the current value $x_o$ of the control amount being treated as initial values. As a result, the control deviation 2002 at the time of the future becomes $\epsilon_1$. If the relationship of $|\epsilon_1| > \epsilon_p$ is still established, the response of the control amount up to the time of the future is obtained in the form of curve C with $u' = u_B + u_1$ obtained by adding the operation amount $u_1$ and $u_B$ to each other which are calculated in accordance with $\epsilon_1$, and the current value $x_o$ being treated as initial values. If with respect to the control deviation $\epsilon_2$, the relationship of $|\epsilon_2| > \epsilon_p$ is still established, by the same processing as in the above case, the operation amount $u_2$ is calculated. Then, the response of the control amount up to the time of the future is obtained in the form of curve D with $u_2' = u_1' + u_2$, i.e., $u_2' = u_B + u_1 + u_2$ and the current value $x_o$ being treated as initial values. Then, if the relationship of $\epsilon_3 > \epsilon_p$ is established, the value of $u_2' - u_B'$ obtained by subtracting the signal 2003 (designated $u_B'$) from $u_2'$ in the subtracter 3700 (if the signal 7001 and the like don't change from the time of obtaining $u_1$ and $u_2$, the relationship of $u_B' = u_B$ is established, while if the signal 7001 and the like change, the relationship of $u_B' \neq u_B$ is established) (when $u_B' = u_B$, $u_2' - u_B = u_1 + u_2$) is applied, as an operation amount optimization signal 3007, to the adder 2400 of the control section. When the relationship of $u_B' = u_B$ is established, the optimal operation amount $u_{opt} = u_B + u_1 + u_2$ is outputted, thus controlling the fuel control valve 5400.

Figure 10:
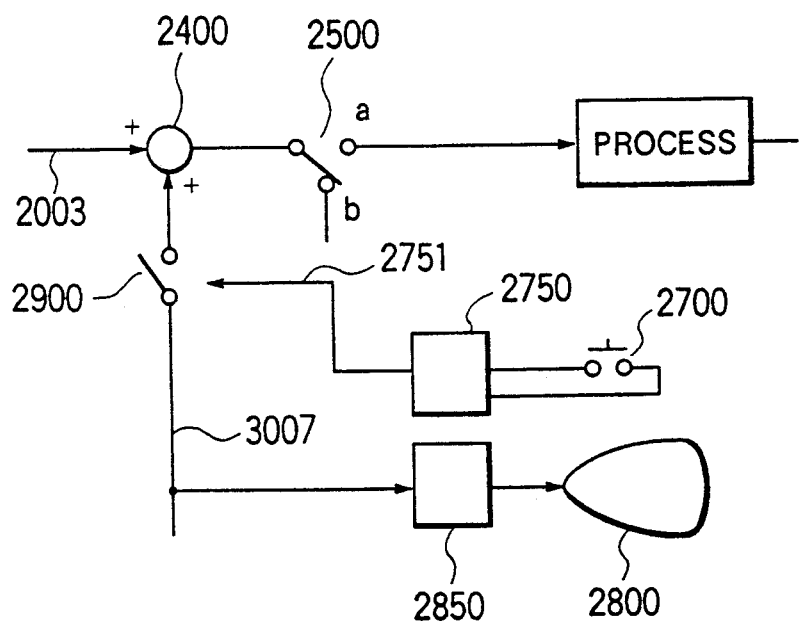
FIG. 10, FIG. 11 and FIG. 12 are respectively block diagrams showing other embodiments of the present invention.

FIG. 10 is a block diagram showing an embodiment which is arranged in such a way that in FIG. 1, a switch 2900 is provided before the adder 2400, and the operation amount correcting signal 3007 used for optimizing the operation amount is not directly added to the operation amount basic signal 2003, but the correcting signal 3007 is displayed in advance on a CRT display 2800 through a display controller 2850 so that the displayed contents can be certified by a user. Further, the present embodiment is arranged in such a way that an enabling button 2700 is provided, a user turns the button 2700 on to input an addition enabling command to an input controller 2750 thereby to make an enabling command signal 2751 generated, and the switch 2900 is turned on by the signal 2751 thereby to input the correcting signal 3007 to the adder 2400.

Figure 11:
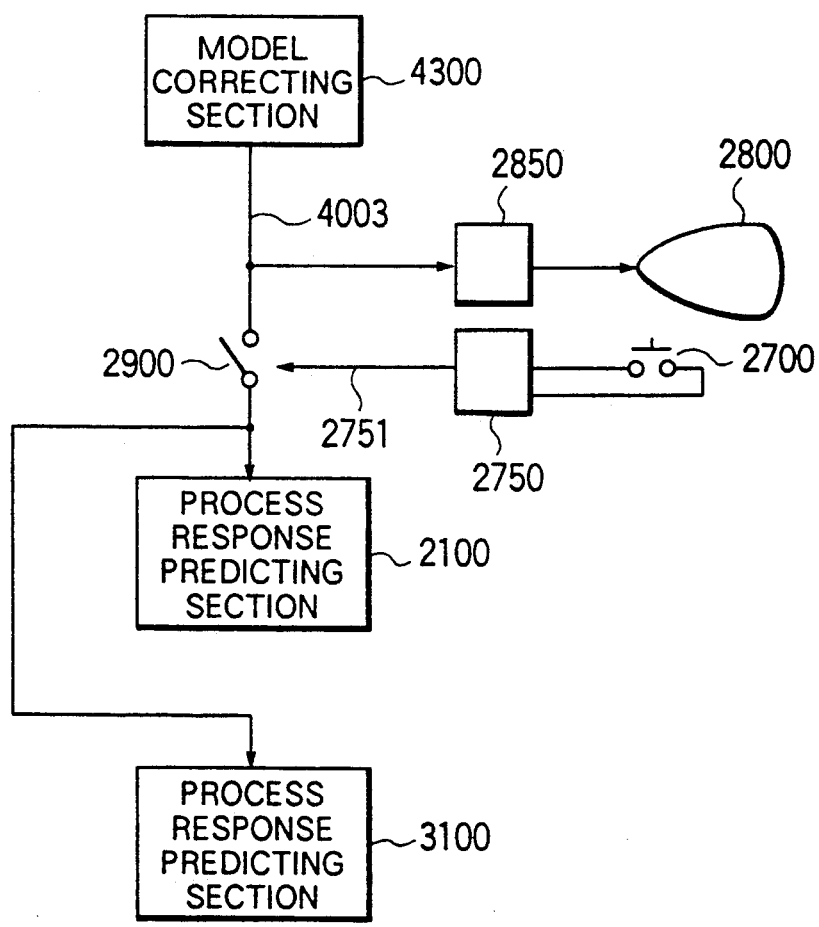

FIG. 11 is a block diagram showing an embodiment which is arranged in such a way that in FIG. 1, a process switch 2900 is provided before the process response predicting sections 2100 and 3100, and the model characteristic parameter correcting signal 4003 is not directly added to both the predicting sections 2100 and 3100, but the correcting signal 4003 is displayed in advance on a CRT display 2800 through a display controller 2850 so that the displayed contents can be certified by a user. Further, the present embodiment is arranged in such a way that an enabling button 2700 is provided, a user turns the button 2700 on to input a correction enabling command to an input controller 2750 thereby to make an enabling command signal 2751 generated, and the switch 2900 is turned on by the signal 2751 thereby to apply the correcting signal 4003 to both the predicting sections 2100 and 3100.

Figure 12:
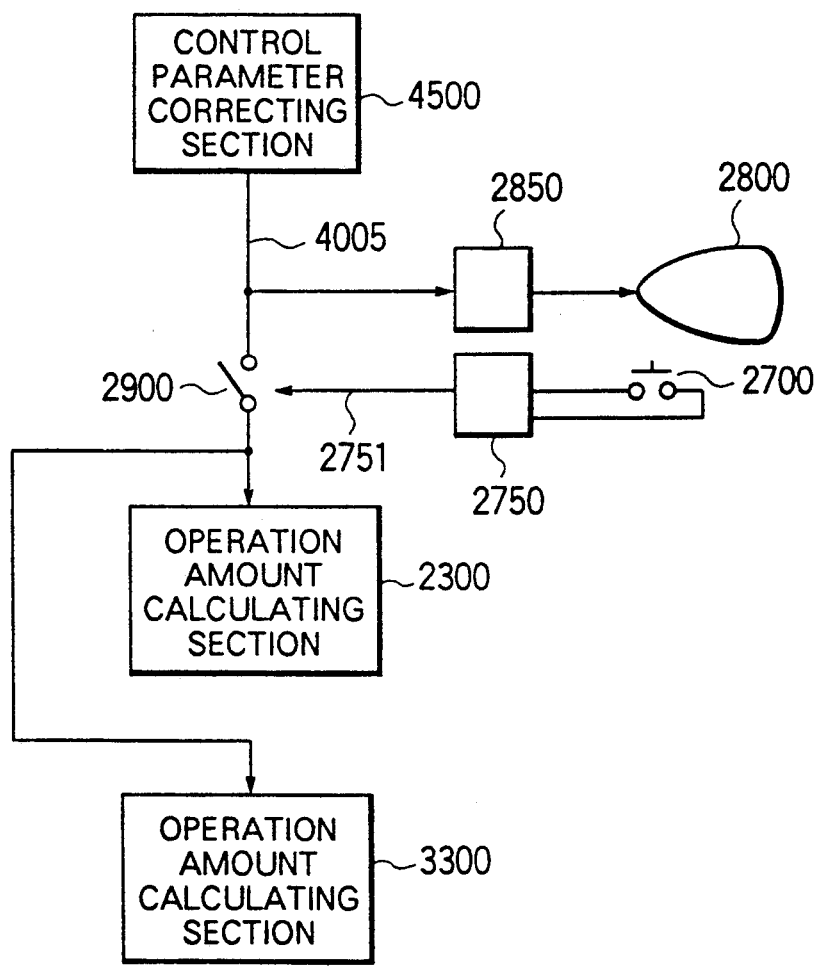

FIG. 12 is a block diagram showing an embodiment which is arranged in such a way that in FIG. 1, a switch 2900 is provided before the operation amount calculating sections 2300 and 3300, and the control parameter correcting signal 4005 is not directly applied to both the calculating sections 2300 and 3300, but the correcting signal 4005 is displayed in advance on a CRT display 2800 through a display controller 2850 so that the displayed contents can be certified by a user Further, the present embodiment is arranged in such a way that an enabling button 2700 is provided, a user turns the button 2700 on to input a correction enabling command to an input controller 2750 thereby to make an enabling command signal 2751 generated, and the switch 2900 is turned on by the signal 2751 to thereby to apply the correcting signal 4005 to both calculating sections 2300 and 3300.

Incidentally, in the case where a user certifies the displayed contents to performs the operation, the operation amount including the correction amount may be also displayed on a display.

As set forth hereinabove, according to the present invention, there are provided the following effects.

(1) Since an optimal operation amount is determined and output without giving any disturbance to the plant, it is possible to control the plant stably and suitably while remaining faithful to the target. This effect greatly depends on the operation amount optimizing section.

(2) Since, even if the characteristics of the process are changed, the desired control characteristics can be maintained, it is possible to perform various applications such as the wide operation from the starting of the plant to the load operation, various kinds of fuel operations and the improvements in the performance of the aged plant. This effect depends on the optimization of repetition by the predictive judgement of the control result by the predicting model, and the parameter tuning section.

(3) Since the optimal tuning of the control section can be automatically performed corresponding to the characteristic change of the process, it is possible to improve the efficiency of the maintenance. This effect largely depends on the parameter tuning section.

(4) By only incorporating the qualitative knowledge and the ability of a veteran operator and a specialist in the form of a knowledge base and the like, the control performance of the plant can be improved to the desired characteristics in a self-growth manner. This effect depends mainly upon the parameter tuning section.

(5) After the operation amount correcting signal is certified by the CRT display before the operation amount basic signal is corrected with the correction signal, the correction can be carried out by the command from a user. Moreover, by perceiving the nonconformance and the like of the correction value and the operation in advance, it is possible to improve the reliability of the control operation.

(6) After the correction signal is certified by the CRT display before the characteristic parameters of the process response prediction are corrected, the correction can be carried out by the command from a user. Moreover, by perceiving the nonconformance and the like of the correction value and the operation in advance, it is possible to improve the reliability of the control operation.

(7) After the correcting signal is certified by the CRT display before the control parameters of the operation amount calculating section are corrected, the correction can be carried out by the command from a user. Moreover, by perceiving the nonconformance and the like of the correction value and the operation in advance, it is possible to improve the reliability of the control operation.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A process controller for controlling a process to a target state using a difference between a predicted value of a control amount of the process for a fixed period of time and a target value of the control amount of the process at the end of the fixed period of time, said process controller comprising:

target value setting means for giving a target value of a process control amount after the fixed period of time has elapsed;

control means comprising:

first predicting means for predicting a response of the process for the fixed period of time on the basis of the present value of the control amount of the process and an operation amount, and basic operation amount calculation means for calculating the operation amount on the basis of a differences between a first prediction obtained by said first prediction means and the target value; and operation amount optimization means comprising:

second prediction means for predicting a response of the process for the fixed period of time on the basis of the present value of the control amount of the process and the basic operation amount, operation amount calculation means for calculating the operation amount on the basis of a difference between a second prediction obtained by said second prediction means and the target value, and means for performing control in such a way that the second prediction and a predetermined evaluation criterion are compared with each other to be evaluated, the present value of the process control amount and the calculation result of the operation amount are repeatedly applied to said second prediction means until the evaluation criterion is satisfied, a correction quantity for the operation amount when the second prediction result satisfies the evaluation criterion is added to the basic operation amount, and the addition result is output to the process.

2. A process controller according to claim 1, further comprising model correction means for correcting characteristic parameters of a model of said first prediction means in said control means and a model of said, second prediction means in said operation amount optimizing means, on the basis of a result of evaluation of an error between a prediction of the process response to an operation amount signal and an actual response signal of the plant.

3. A process controller according to claim 1, further comprising parameter tuning means for correcting control parameters of said basic operation amount calculation means in said control means and said operation amount calculation means in said operation amount optimizing means, on the basis of a result of evaluating a relationship between actual response characteristics of the process and the control target value by a predetermined performance index.

4. A process controller according to claim 1, further comprising model correction mean and parameter tuning means.

5. A process controller according to claim 2, wherein said model correction means stores therein correction rules of the characteristic parameters of the model in the form of a knowledge base, applies evaluation results of the model error to membership functions to classify the evaluation results thereinto, and is made to operate by the fuzzy reasoning employing rules corresponding to the classified result.

6. A process controller according to claim 3, wherein said parameter tuning means is made to operate by a neural network to be adapted to calculate setting values of the control parameters at a high speed on the basis of a result of learning in advance target setting values of the plant, response characteristic evaluation indexes and state quantities of the process by receiving them as its input.

7. A process controller according to claim 6, wherein a fuzzy reasoning function and a learning function are additionally provided in such a way that determination rules of correction quantities of the characteristic parameters are stored in the form of a knowledge base, the response characteristics of the process are applied to membership functions to be classified thereinto, correction quantities of parameter setting values are obtained using rules corresponding to the classified result by the fuzzy interference, the control parameter setting values are corrected by the correction quantities, and the neural network is made to carry out the learning with the corrected values being treated as a control parameter setting teacher signal.

8. A process controller for controlling a state of a process to a target state using a difference between a predicted value of a control amount of the process for a fixed period of time and a target value of the control amount of the process at the end of the fixed period of time, said process controller comprises:
means for giving a target value of the control amount of the process;
means for predicting a response of the process for the fixed period of time on the basis of the current value of the control amount of the process and an operation amount;
means for calculating the operation amount on the basis of a difference between the predicted result and the target value;
means for comparing the predicted result and a predetermined evaluation criterion with each other;
means for repeatedly applying the calculation result of the present value of the process controlled variable and the operation amount of the predicted result until the evaluation criterion is satisfied;
means for calculating a correction quantity for the operation amount when the predicted result satisfies the evaluation criterion; and
display means for displaying the correction quantity for optimizing the operation amount,
wherein the correction operation is carried out by a correction enabling command from an operator.

9. A process controller for controller a state of a process to a target state using a difference between a predicted value of a control amount of the process for a fixed period of time and a target value of the control amount of the process at the end of the fixed period of time, and process controller comprises:
means for giving a target value of the controlled variable of the process;
means for predicting a response of the process for the fixed period of time on the basis of the present value of the control amount of the process and an operation amount;
means for calculating the operation amount on the basis of a difference between the predicted result and the target value;
means for comparing the predicted result and a predetermined evaluation criterion with each other;
means for repeatedly applying the calculation result of the present value of the process controlled amount and the operation amount of the predicted result until the evaluation criterion is satisfied;
means for calculating a correction quantity for the operation amount when the predicted result satisfies the evaluation criterion;
means for correcting characteristic parameters of a model of prediction means on the basis of a result of evaluation of an error between a prediction result of the process response to the operation amount and an actual response result of the plant; and
display means for displaying, before correcting the characteristic parameters of said prediction means, the correction amount, and
wherein the correction operation is carried out by a correction enabling command from an operator.

10. A process controller for controlling a state of a process to a target state using a difference between a predicted value of a controlled variable of the process for a fixed period of time and a target value of the control amount of the process at the said process controller comprises:
parameter tuning means for giving a target value of the control amount of the process;
means for predicting a response of the process up for the fixed period of time on the basis of the current value of the control amount of the process and an operation amount;
means for calculating the operation amount on the basis of a difference between the predicted result and the target value;
means for comparing the predicted result and a predetermined evaluation criterion with each other;
means for repeatedly applying the calculation result of the present value of the process control amount and the operation amount to the predicted result until the evaluation criterion is satisfied;
means for calculating a correction quantity for the operation amount when the predicted result satisfies the evaluation criterion;
means for correcting control parameters on the basis of a result of evaluating a relationship between actual response characteristics of the process and the control target value by a predetermined performance index; and
display means for displaying, before correcting the control parameters, the correction amount of the control parameters, and wherein the correction operation is carried out by a correction enabling command for an operator.

11. A process controller for controlling a state of a process to a target state using a difference between a predicted value of a control amount of the process for a fixed period of time and a target value of the control amount of the process at the end of the fixed period of time, said process controller comprises:
- means for giving a target value of the control amount of the process for the fixed period of time;
- means for predicting a response to the process for the fixed period of time on the basis of the current value of the control amount of the process and an operation amount;
- means for calculating the operation amount on the basis of a difference between the predicted result and the target value;
- means for comparing the predicted result and a predetermined evaluation criterion with each other;
- means for repeatedly applying the calculation result of the present value of the process control amount and the operation amount to the predicted result until the evaluation criterion is satisfied;
- means for calculating a correction quantity for the operation amount when the predicted result satisfies the evaluation criterion; and
- display means for displaying the operation amount having the correction amount for optimizing the operation amount, and
- wherein the correction operation is carried out by a correction enabling command for an operator.

12. A process controller for controlling a state of a process to a target state using a difference between a predicted value of a control amount of the process for a fixed period of time and a target value of the control amount of the process at the end of the fixed period of time, said process controller comprises:
- means for giving a target value of the control amount of the process;
- means for predicting a response of the process for the fixed period of time on the basis of the current value of the control amount of the process and an operation amount;
- means for calculating the operation amount on the basis of a difference between the predicted result and the target value;
- means for comparing the predicted result and a predetermined evaluation criterion with each other;
- means for repeatedly applying the calculation result of the present value of the process control amount and the operation amount to the prediction until the evaluation criterion is satisfied;
- means for calculating a correction quantity for the operation amount when the predicted result satisfies the evaluation criterion;
- means for correcting characteristic parameters of a model of prediction means on the basis of a result of evaluation of an error between a prediction result of the process response to the operation amount and an actual response result of the plant; and
- display means for displaying, before correcting the control parameters of said prediction means, the correction amount including therein the correction amount, and
- wherein the correction operation is carried out by a correction enabling command for an operator.

13. A process controller for controlling a state of a process to a target state using a difference between a predicted value of a control amount of the process for a fixed period of time and a target value of the control amount of the process at the end of the fixed period of time, said process controller comprises:
- parameter tuning means for giving a target value of the control amount of the process for the fixed period of time;
- means for predicting a response of the process for the fixed period of time on the basis of the current value of the control amount of the process and an operation amount;
- means for calculating the operation amount on the basis of a difference between the resultant predicted result and the target value;
- means for comparing the predicted result and a predetermined evaluation criterion with each other;
- means for repeatedly applying the calculation result of the present value of the process control amount and the operation amount to the predicted result until the evaluation criterion is satisfied;
- means for calculating a correction quantity for the operation amount when the predicted result satisfies the evaluation criterion;
- means for correcting control parameters on the basis of a result of evaluating a relationship between actual response characteristics of the process and the control target value by a predetermined evaluation index; and
- display means for displaying, before correcting the control parameters, the operation amount including therein the correction amounts of the control parameters, and
- wherein the correction operation is carried out by a correction enabling command for an operator.

* * * * *